United States Patent
Kiuchi et al.

(10) Patent No.: US 10,755,385 B2
(45) Date of Patent: Aug. 25, 2020

(54) IMAGE PROCESSING APPARATUS AND RECORDING MEDIUM

(71) Applicant: OMRON Corporation, Kyoto (JP)

(72) Inventors: Yutaka Kiuchi, Kusatsu (JP); Tsunehiko Araki, Kusatsu (JP)

(73) Assignee: OMRON Corporation, Kyoto (JP)

(*) Notice: Subject to any disclaimer, the term of this patent is extended or adjusted under 35 U.S.C. 154(b) by 12 days.

(21) Appl. No.: 16/129,829

(22) Filed: Sep. 13, 2018

(65) Prior Publication Data

US 2019/0122341 A1  Apr. 25, 2019

(30) Foreign Application Priority Data

Oct. 24, 2017  (JP) ................................ 2017-205397

(51) Int. Cl.
  *G06T 5/00* (2006.01)
  *G06T 9/00* (2006.01)
  *H04N 19/154* (2014.01)

(52) U.S. Cl.
  CPC ............... *G06T 5/001* (2013.01); *G06T 9/00* (2013.01); *H04N 19/154* (2014.11)

(58) Field of Classification Search
  USPC ........................................................ 382/232
  See application file for complete search history.

(56) References Cited

U.S. PATENT DOCUMENTS 5,209,220 A * 5/1993 Hiyama ................... H04N 1/64
  348/65
5,699,459 A * 12/1997 Kawahara ............... G06T 9/007
  375/240.24

(Continued)

FOREIGN PATENT DOCUMENTS

CN     1949828      4/2007
CN     101055256    10/2007

(Continued)

OTHER PUBLICATIONS

Yung-Kai Lai, Haar Wavelet Approach to Compressed Image Quality Measurement, Academic Press. (Year: 2000).*

(Continued)

*Primary Examiner* — Wednel Cadeau
(74) *Attorney, Agent, or Firm* — JCIPRNET

(57) ABSTRACT

The disclosure provides an image processing apparatus and a recording medium which enable easy setting of a degree of compression such that it is in a range in which there is substantially hardly any influence on an inspection result when the degree of compression is set. First information including a first processing result acquired when an image measurement processing is executed on raw image data and at least a part of first state information representing a state in the execution process of the image measurement processing and second information including a second processing result acquired when the image measurement processing is executed on restored image data that is acquired by compressing the raw image data and then restoring compressed image data and information of the same type as that of the information included in the first information from the second state information are output in association with each other.

18 Claims, 14 Drawing Sheets

(56) References Cited

U.S. PATENT DOCUMENTS

| | | | | |
|---|---|---|---|---|
| 6,031,939 A * | 2/2000 | Gilbert | ................ | H04N 19/147 |
| | | | | 375/E7.088 |
| 6,219,156 B1 * | 4/2001 | Yoshida | .................... | G06T 9/00 |
| | | | | 358/404 |
| 2004/0131264 A1 * | 7/2004 | Sakuyama | ........... | H04N 19/162 |
| | | | | 382/233 |
| 2015/0371431 A1 * | 12/2015 | Korb | ................. | G06K 9/00208 |
| | | | | 382/113 |

FOREIGN PATENT DOCUMENTS

| | | |
|---|---|---|
| CN | 104394385 | 3/2015 |
| JP | H1173511 | 3/1999 |
| JP | 2005039542 | 2/2005 |
| WO | 2013099449 | 7/2013 |

OTHER PUBLICATIONS

"Office Action of China Counterpart Application," with English translation thereof, dated Sep. 27, 2019, p. 1-p. 13.
"Search Report of Europe Counterpart Application", dated Mar. 21, 2019, p. 1-p. 8.
Yung-Kai Lai, et al., "A Haar Wavelet Approach to Compressed Image Quality Measurement," Journal of Visual Communication and Image Representation, vol. 11, Mar. 2000, pp. 17-40.
Javier Silvestre-Blanes, et al., "Compress-Image Quality Measures in Image-Processing Applications," 2009 IEEE Conference on Emerging Technologies & Factory Automation, Sep. 2009, pp. 1-4.

* cited by examiner

1. Image conversion logging

| Saving conditions | Saving destination | Range designation |

Saving conditions

Condition: ○ No saving  ○ Save in case of NG  ◉ Save all

Calculation equation: [          ]

Calculation result: 0.0000

Determination condition: [-9999999999.9999] – [9999999999.9999]

Image format

○ Bit map  ◉ Jpeg   Image quality [100] [<] |||||| [>]

[Reference] — 231

[OK] — 230   [Cancel] — 240

IMAGE PROCESSING APPARATUS AND RECORDING MEDIUM

CROSS-REFERENCE TO RELATED APPLICATION

This application claims the priority benefit of Japan application serial no. 2017-205397, filed on Oct. 24, 2017. The entirety of the above-mentioned patent application is hereby incorporated by reference herein and made a part of this specification.

BACKGROUND

Technical Field

The disclosure relates to an image processing apparatus and an image processing program for visually measuring an object.

Description of Related Art

In various production fields, image processing apparatuses visually measuring objects such as manufactured products are used. In addition, there has been demand for saving image data and the like used for the measurement.

In Japanese Patent Application Laid-Open No. H11-073511, it is disclosed that "a compression process is performed on image data, and compressed image data is saved such that many images can be saved" (see paragraph [0045]).

When image data is irreversibly compressed, the amount of data can be significantly reduced more than when the image data is lossless compressed. However, image data that is irreversibly compressed is degraded with respect to image data before compression, and thus, there is a concern that the measurement accuracy will decrease. For this reason, when the degree of compression is high, there is an influence on a measurement result.

When setting the degree of compression, a user determines a degree of compression that will have no influence on a measurement result based on experience.

SUMMARY

According to one example of the present disclosure, an image processing apparatus that visually measures an object is provided. The image processing apparatus includes: an image converting unit that generates second image data by irreversibly compressing first image data acquired by imaging the object at a predetermined degree of compression and then restoring compressed image data to image data having a same format as the first image data; a measurement unit that executes an image measurement processing on image data based on predetermined measurement conditions; and an output unit that outputs first information including a processing result acquired when the image measurement processing is executed on the first image data and at least a part of information representing a state in an execution process of the image measurement processing and second information including a processing result acquired when the image measurement processing is executed on the second image data and information of a same type as the information included in the first information from the information representing the state in the execution process of the image measurement processing in association with each other.

According to another example of the disclosure, a non-transitory recording medium that records an image processing program for visually measuring an object is provided. The image processing program causing a computer to execute: a step of generating second image data by irreversibly compressing first image data acquired by imaging the object at a predetermined degree of compression and then restoring compressed image data to image data having a same format as the first image data; a step of executing an image measurement processing on image data based on predetermined measurement conditions; and a step of outputting first information including a processing result acquired when the image measurement processing is executed on the first image data and at least a part of information representing a state in an execution process of the image measurement processing and second information including a processing result acquired when the image measurement processing is executed on the second image data and information of a same type as the information included in the first information from the information representing the state in the execution process of the image measurement processing in association with each other.

BRIEF DESCRIPTION OF THE DRAWINGS

FIG. 7 is a diagram illustrating one example of a setting screen for setting saving conditions;

DESCRIPTION OF THE EMBODIMENTS

Figure 1:
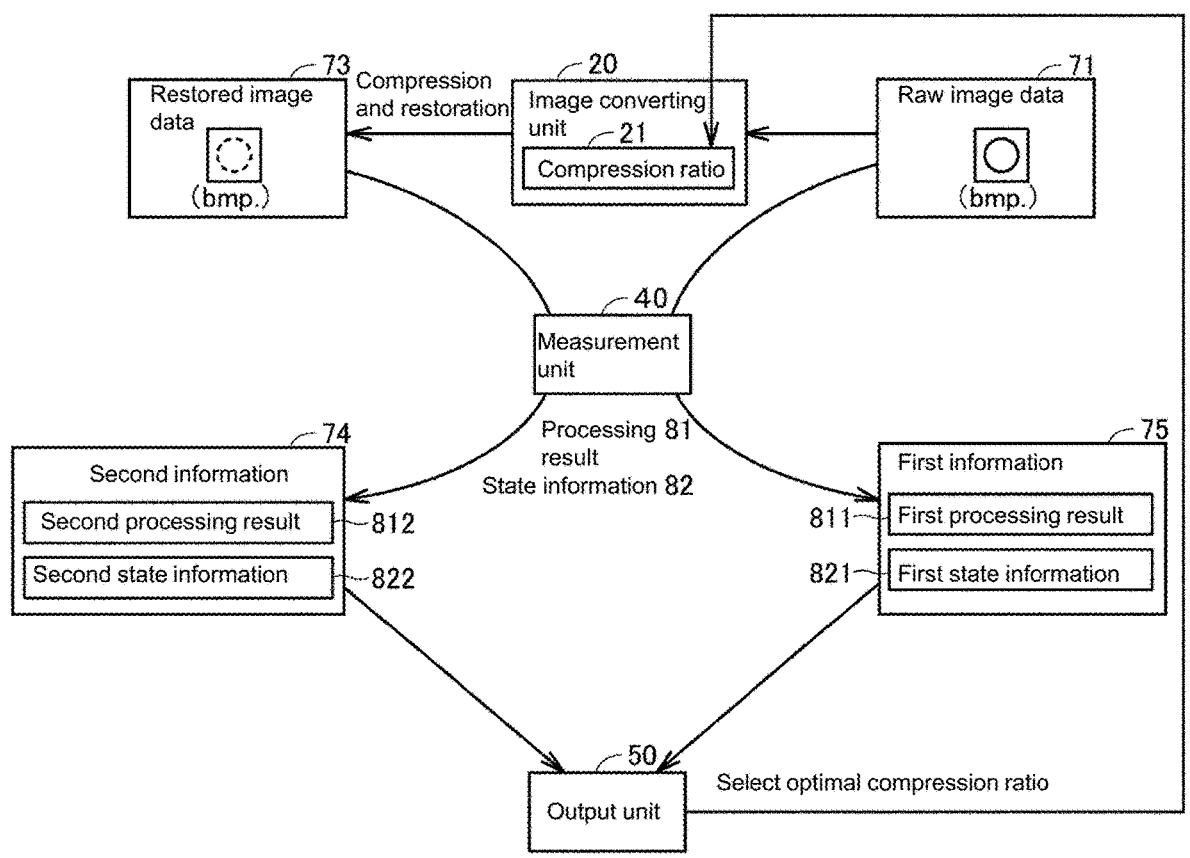
FIG. 1 is a diagram schematically illustrating a situation in which an image processing apparatus 1 according to this embodiment is applied.

The disclosure enables easy setting of the degree of compression such that it is in a range in which there is substantially hardly any influence on an inspection result when the degree of compression is set as described above.

According to this disclosure, an influence of degradation of data according to irreversibly compression of the first image data on the image measurement processing can be checked by comparing the first information with the second information. As a result, the degree of compression can be set such that there is no substantial influence on the image measurement processing.

In the disclosure described above, the second information may include information representing an amount of information of the image data before the restoration of the second image data.

According to this disclosure, the amount of information that can be reduced by compressing the first image data can be checked, and an effect of the compression can be checked.

In the disclosure described above, the image converting unit may further include a first measurement unit that measures a conversion time required for generating the second image data based on the first image data. The second information may include information representing the conversion time.

According to this disclosure, when measurement is performed using the second image data, a conversion time that is not required when measurement is performed using the first image data can be checked.

In the disclosure described above, the measurement unit may further include a second measurement unit that measures a processing time required for the image measurement processing. The information representing the state in the execution process of the image measurement processing may include information representing the processing time.

According to this disclosure, when the image measurement processing is executed using the second image data acquired by degrading the first image data, a decrease in the processing time according to a decrease in the amount of data can be checked, and the effect according to the compression can be checked.

In the disclosure described above, the image measurement processing may include a process of calculating a feature amount from image data. The information representing the state in the execution process of the image measurement processing may include information representing the feature amount.

According to this disclosure, the degree of change in the feature amount, which is calculated in the process of acquiring a processing result, according to the compression of the first image data can be checked, and the feature amount becomes a reference when the compression ratio is set.

In the disclosure described above, the output unit may further output the first image data and the second image data.

According to this disclosure, the first image data before compression and the second image data after compression and conversion can be disclosed, and the degradation of an image according to the compression of the image data can be visually checked.

In the disclosure described above, the image processing apparatus further includes a comparison unit that calculates a degree of degradation of the second image data with respect to the first image data by comparing first image quality information included in the first image data with second image quality information included in the second image data. The output unit further outputs the degree of degradation.

According to this disclosure, the degree of degradation of the second image data can be checked based on the image quality information included in the image data, and accordingly, the degree of compression can be set while the degree of degradation is checked.

In the disclosure described above, the image converting unit may generate a plurality of pieces of the second image data by changing the degree of compression. The output unit may output a plurality of pieces of the second information acquired by executing the image measurement processing for the plurality of pieces of the second image data and the degrees of compression in association with each other.

According to this disclosure, a relation between the degree of compression and the second information can be checked, and, as a result, an appropriate degree of compression can be selected without changing the degree of compression.

In the disclosure described above, the image converting unit may generate a plurality of pieces of the second image data by changing the degree of compression. The output unit may output a relation between the degree of compression and the conversion time.

According to this disclosure, a relation between the degree of compression and the conversion time can be checked, and, as a result, a degree of compression for which conversion is completed within a desired time can be selected without changing the degree of compression.

According to this disclosure, an influence of degradation of data according to irreversibly compression of the first image data on the image measurement processing can be checked by comparing the first information with the second information. As a result, the degree of compression can be set such that there is no substantial influence on the image measurement processing.

When a user sets the degree of compression, the user can easily set the degree of compression in a range in which there is substantially hardly any influence on an inspection result.

An embodiment of the disclosure will be described in detail with reference to the drawings. The same reference signs will be assigned to the same part or parts corresponding to each other in the drawings, and description thereof will not be repeated.

1. Application Example

First, one example of a situation in which the disclosure is applied will be described with reference to FIG. 1. FIG. 1 is a diagram schematically illustrating a situation to which an image processing apparatus 1 according to this embodiment is applied.

The image processing apparatus 1 can visually measure an object, and includes an image converting unit 20, a measurement unit 40, and an output unit 50.

The image converting unit 20 irreversibly compresses raw image data acquired by imaging an object with a predetermined degree of compression (hereinafter, referred to as a "compression ratio 21") and then restores the compressed image data to image data having the same format as the raw image data, thereby generating restored image data 73.

The raw image data is one example of "first image data" according to the disclosure. The data format of the raw image data is a data format that corresponds to an image measurement processing executed by the measurement unit 40 and is, for example, a bmp format. The raw image data 71 is acquired by a camera 2 that is one example of an imaging unit imaging an object. The image data transmitted from the camera 2 may not the same as the raw image data 71. Thus, a configuration may be employed in which a raw image is transmitted from the camera 2, and the image processing apparatus 1 generates raw image data 71 having a bmp format based on the raw image. In addition, the image processing apparatus 1 may include an imaging unit.

The restored image data 73 is data acquired by irreversibly compressing the raw image data 71 and is data that is degraded with respect to the raw image data 71 before compression.

The measurement unit 40 executes an image measurement processing on image data based on predetermined measurement conditions. In the image processing apparatus 1, the measurement unit 40 executes an image measurement processing on image data, whereby a processing result 81 that is a result of the image measurement processing and other information is acquired. The other information includes information representing a state in the execution process of the image measurement processing (hereinafter, referred to as "state information 82").

Hereinafter, the processing result 81 and the state information 82 acquired when an image measurement processing is executed on the raw image data 71 will be respectively referred to as a first processing result 811 and first state information 821. In addition, the processing result 81 and the state information 82 acquired when an image measurement processing is executed on the restored image data 73 will be respectively referred to as a second processing result 812 and second state information 822.

The output unit 50 outputs first information 75 including the first processing result 811 and at least a part of the first state information 821 and second information 74 including the second processing result 812 and information of the same type as the information included in the first information 75 among the second state information 822 in association with each other.

A destination of the output of the first information 75 and the second information 74 in association with each other from the output unit 50 is, for example, a display unit that visually displays information or a printer, or a computer, a tablet terminal, or the like that is communicatively connected to the image processing apparatus 1.

The image processing apparatus 1 according to this embodiment outputs the first information 75 and the second information 74 in association with each other. For this reason, the first information 75 can be compared with the second information 74, and an influence of degradation of image data on the processing result 81 and the state information 82 can be checked. As a result, the compression ratio 21 can be set such that there is no substantial influence on the image measurement processing.

2. Specific Example

Hereinafter, more detailed configurations and processings of an image processing apparatus 1 and an image processing system SYS according to this embodiment will be described as more specific application examples of the disclosure.

<A. Configuration of Image Processing System SYS>

Figure 2:
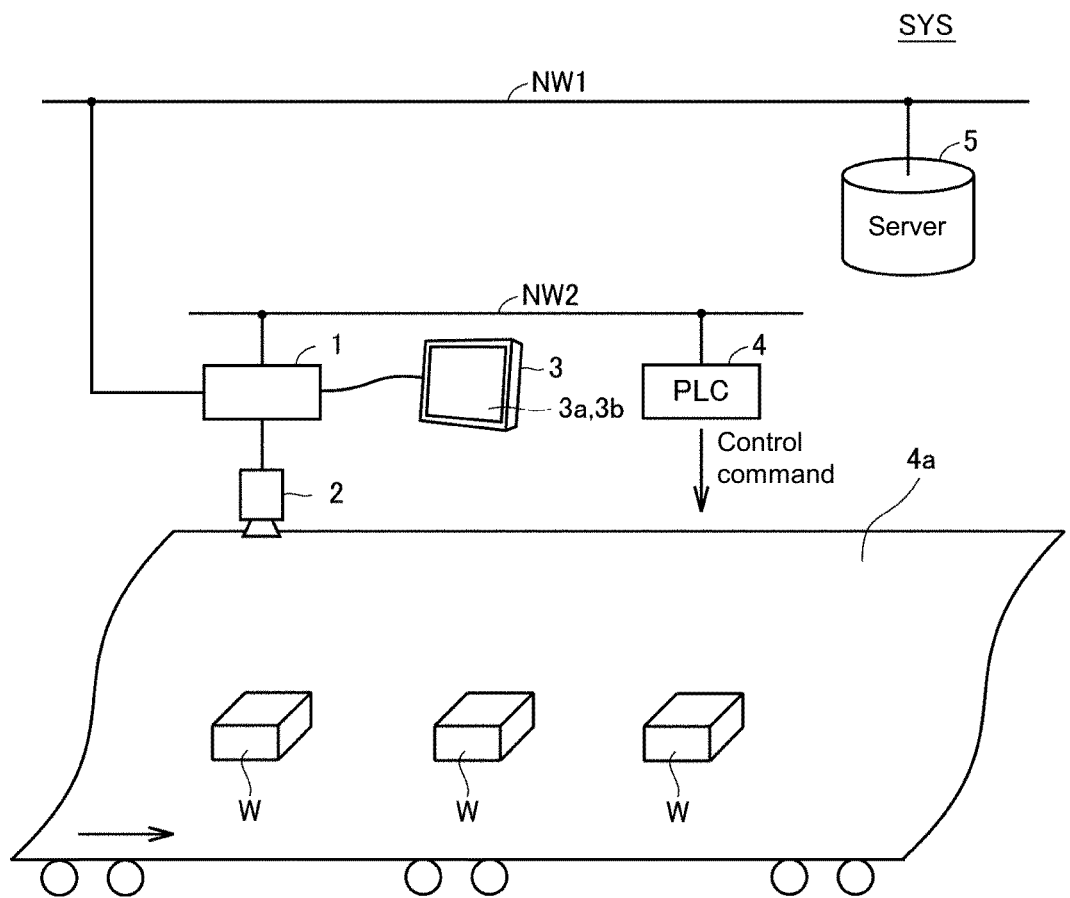
FIG. 2 is a schematic diagram illustrating a basic configuration of an image processing system according to this embodiment.

FIG. 2 is a schematic diagram illustrating a basic configuration of the image processing system SYS according to this embodiment. The image processing system SYS includes an image processing apparatus 1 and a camera 2 as its major constituent elements. The camera 2 generates image data by imaging an object W conveyed by a conveying device 4a such as an belt conveyer. The image processing apparatus 1 visually measures the object W based on image data transmitted from the camera 2.

The camera 2 is an imaging unit that generates image data by imaging a subject present in a visual field. The camera 2 includes an optical system such as a lens, a diaphragm, and the like and light receiving elements such as charge coupled device (CCD) image sensors or complementary metal oxide semiconductor (CMOS) image sensors as its major constituent elements. The image data generated by the camera 2 is, for example, data that is not processed such as raw data or data having the bmp format.

The image processing apparatus 1 performs image processing on the image data generated by the camera 2, thereby measuring the state of an object W. For example, the image processing apparatus 1 may perform pass/fail determination of the object W, measurement of physical property values of the object W, quality checking of the object W, and the like.

The image processing apparatus 1 can save results of image processing and information and the like acquired in the execution process of the image processing in a data storing unit.

The data storing unit is a recording medium and is a medium storing information of a program and the like using an electric, magnetic, optical, mechanical, or chemical action such that a computer, any other device, a machine, and the like can read the recorded information of the program and the like. The data storing unit includes a server 5 connected to the image processing apparatus 1 through a network (hereinafter, also referred to as a "NW") 2, internal memories such as hard disks 130 included in the image processing apparatus 1, and an external memory 6 that can be directly connected to the image processing apparatus 1.

In addition, the image processing system SYS may include a programmable logic controller (hereinafter, also referred to as a "PLC") 4 that can be connected to the image processing apparatus 1 through a NW 1.

For example, the image processing apparatus 1 transmits a measurement result to the PLC 4. The PLC 4 controls the conveying device 4a based on the processing result 81 transmitted from the image processing apparatus 1. In one embodiment, the NW 1 employs a bus or a network performing fixed-period communication in which an arrival time of data is guaranteed. For buses or networks performing such a fixed-period communication, EtherCAT (registered trademark), EtherNet/IP (registered trademark), DeviceNet (registered trademark), CompoNet (registered trademark), and the like are known.

The NW 2 is, typically, a local area network (LAN) and is disposed separately from the NW 1 that is a communication path for the PLC 4. In addition, the NW 1 and the NW 2 may be the same network. In addition, the PLC 4 and the server 5 may be communicatively connected to each other.

The image processing apparatus 1 can be connected to an operation display device 3. The operation display device 3 is a device that is used for performing setting relating to various processes executed by the image processing apparatus 1. The operation display device 3 includes a display unit 3a and a touch panel 3b mounted on a display surface of the display unit 3a. The display unit 3a is, typically, configured of a liquid crystal display and displays various kinds of information acquired from the image processing apparatus 1 for a user. The touch panel 3b functions as an input unit that is used for inputting information relating to various settings. For example, a user can perform setting of image processing conditions, setting of saving conditions, and the like by operating the touch panel 3b based on information displayed on the display unit 3a. The operation display device 3 may be a part of the image processing apparatus 1. Although the input unit has been described as being configured of a touch panel, the input unit may be configured of one or both of a keyboard and a mouse.

<B. Compression Timing of Image Data>

Figure 3:
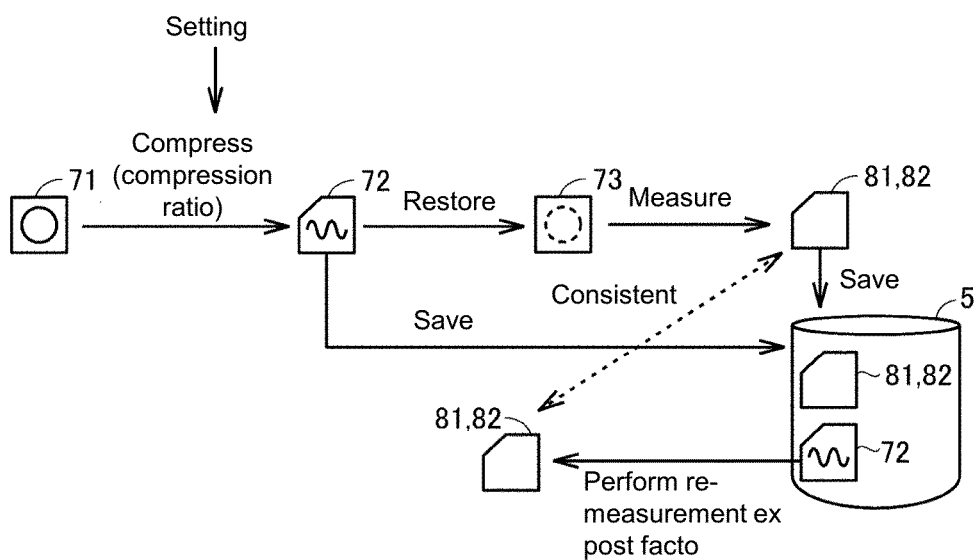
FIG. 3 is a diagram illustrating a first timing at which image data is compressed.
Figure 4:
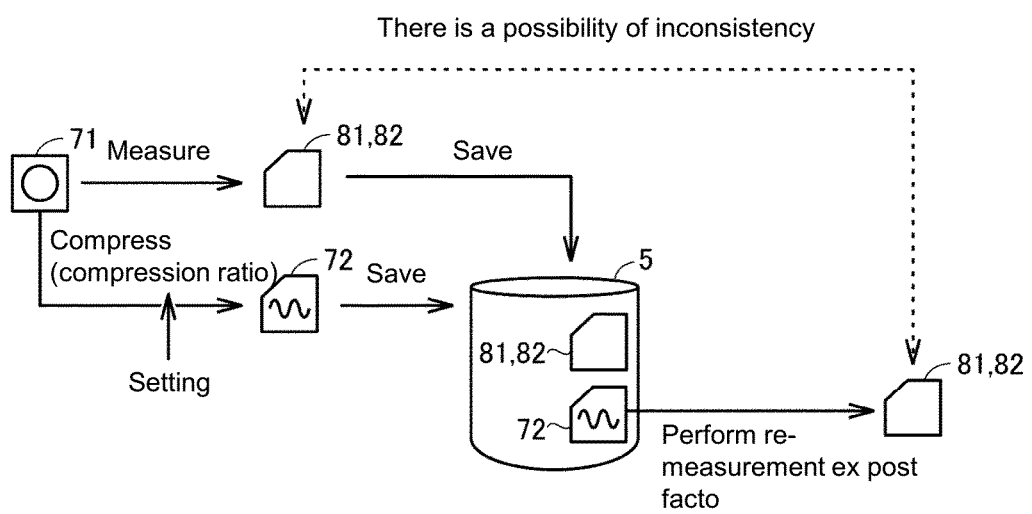
FIG. 4 is a diagram illustrating a second timing at which image data is compressed.

The image processing apparatus 1 can compress image data. FIG. 3 is a diagram illustrating a first timing at which image data is compressed. FIG. 4 is a diagram illustrating a second timing at which image data is compressed.

The image processing apparatus 1, as illustrated in FIGS. 3 and 4, can compress image data at the first timing that is before execution of an image measurement processing or the second timing that is after the execution of the image measurement processing.

The compression ratio applied at the time of compression can be set by a user operation. The user operation is, for example, an operation on the touch panel 3b that is performed by a user.

When compression is performed at the first timing, the image processing apparatus 1 generates compressed image data 72 by compressing the raw image data 71 with a predetermined compression ratio, and then restores the compressed image data 72 to restored image data 73. Then, the image processing apparatus 1 executes an image measurement processing on the restored image data 73 to acquire a processing result 81 and transmits the processing result 81 to the PLC 4. In addition, the image processing apparatus 1 can save the compressed image data 72, the processing result 81, the state information 82, and the like in the server 5.

Since the compressed image data 72 is saved in the server 5, the amount of data to be saved can be reduced more than when the raw image data 71 before compression is saved. Here, the processing result 81 and the state information 82 are results acquired by the image measurement processing executed on the restored image data that has been acquired by restoring the compressed image data 72 to the same format as the format of the raw image data 71. For this reason, when measurement conditions of the image measurement processing or the processing result 81 are evaluated ex post facto, a result having reproducibility when the image measurement processing is executed on the restored image data 73 is acquired.

However, when raw image data is compressed before execution of the image measurement processing, and image data after the compression is used for measurement, there is a problem in that a measurement accuracy becomes lower than when measurement is executed on the raw image data 71.

When compression is performed at the second timing, the image processing apparatus 1 executes the image measurement processing on the raw image data 71 to acquire a processing result 81 and transmits the processing result 81 to the PLC 4. In addition, the image processing apparatus 1 can save compressed image data 72 acquired by compressing the raw image data 71 with a predetermined compression ratio in the server 5 in addition to the processing result 81, the state information 82, and the like.

Also when compression is performed at the second timing, similar to the case in which compression is performed at the first timing, the compressed image data 72 is saved in the server 5, and accordingly, the amount of data to be saved can be reduced. In addition, since the image measurement processing is executed on the raw image data 71, from the viewpoint of degradation of image data, the processing result 81 can be acquired without lowering the measurement accuracy.

However, the processing result 81 and the state information 82 are results acquired by the image measurement processing executed on the raw image data 71. Meanwhile, the saved image data is the compressed image data 72 acquired by compressing the raw image data 71. For this reason, when the measurement conditions of the image measurement processing or the processing result 81 is evaluated ex post facto, there is concern that a result having reproducibility may not be acquired when the image measurement processing is executed on the restored image data 73 acquired by restoring the compressed image data 72.

In this way, either when compression is performed at the first timing or when compression is performed at the second timing, while the amount of data can be decreased and the number of images that can be saved can be increased, there is the concern described above.

For this reason, a user has a desire to set a compression ratio in a range in which there is no substantial influence on the measurement result.

The image processing apparatus 1 has a setting function for setting a compression ratio such that a high compression ratio can be set without substantial influence on the measurement result.

In addition, the image processing apparatus 1 may have a function of selecting compression at the first timing, compression at the second timing, or no compression. The image processing apparatus 1 displays a setting screen for selection on the display unit 3a and performs setting in accordance with a user's operation on the touch panel 3b. In this way, the user can select compression or no compression and a compression timing in the case of compression, and accordingly, a setting according to a user's demand can be performed when a high measurement accuracy is required, a case in which the number of times of execution of the image measurement processing is large, and the amount of data is large, a case in which the image processing time is desired to be shortened, or the like.

<C. Hardware Configuration of Image Processing Apparatus 1>

Figure 5:
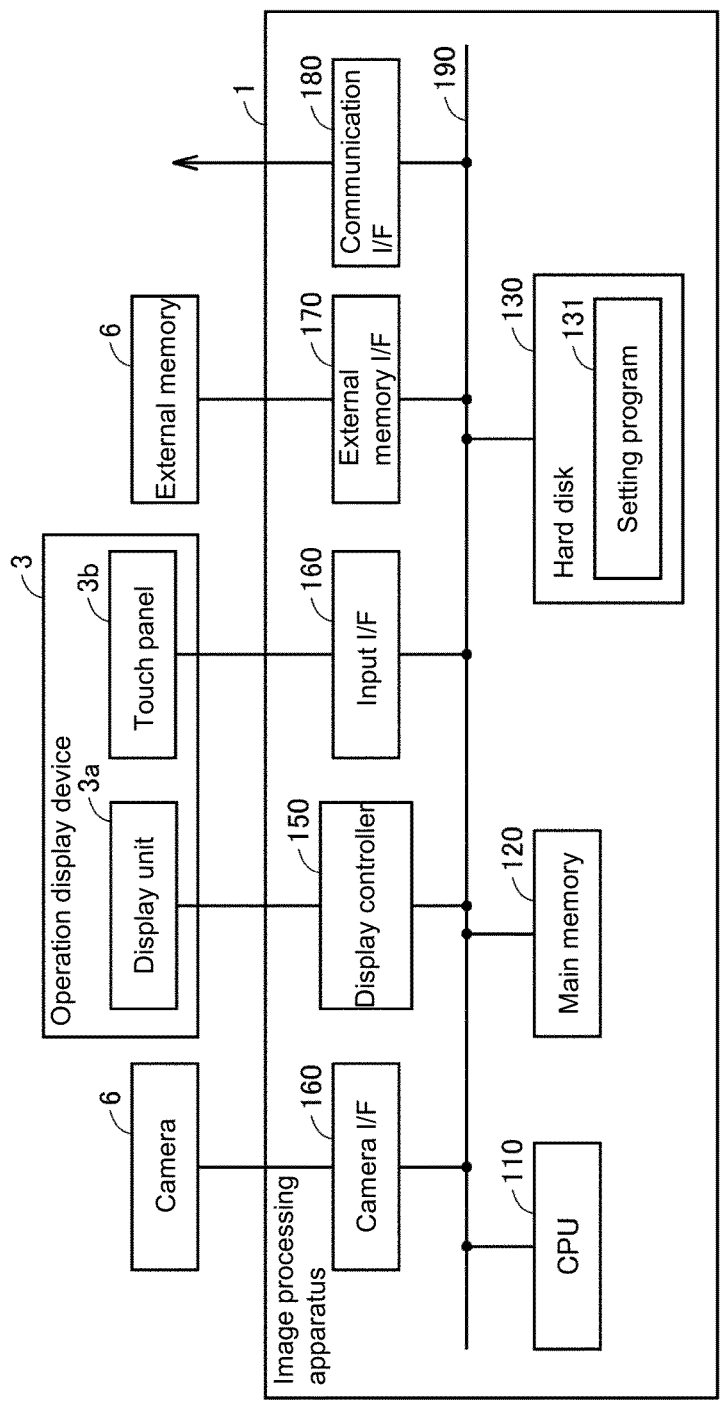
FIG. 5 is a schematic diagram illustrating the hardware configuration of an image processing apparatus.

FIG. 5 is a schematic diagram illustrating the hardware configuration of the image processing apparatus 1. The image processing apparatus 1 includes a central processing unit (CPU) 110, a main memory 120, a hard disk 130, a camera interface (I/F) 140, a display controller 150, an input I/F 160, an external memory I/F 170, and a communication I/F 180. Such units are interconnected through the bus 190 to enable data communication.

The CPU 110 expands programs (codes) including a setting program 131 installed in the hard disk 130 into the main memory 120 and executes these programs in a predetermined order, thereby performing various arithmetic operations.

The main memory 120 is, typically, a volatile storage device such as a dynamic random access memory (DRAM).

The hard disk 130 is an internal memory included in the image processing apparatus 1 and is a nonvolatile storage device. The hard disk 130 includes the setting program 131. In addition, except the hard disk 130 or instead of the hard disk 130, a semiconductor memory device such as a flash memory may be employed. The various programs do not need to be saved in the hard disk 130 and may be saved in the server 5 that can communicate with the image processing apparatus 1 or the external memory 6 that can be directly connected to the image processing apparatus 1.

The camera I/F 140 relays data transmission between the CPU 110 and the camera 2.

In other words, the camera I/F 140 is connected to the camera 2 that generates image data. In addition, the camera I/F 140 gives a command used for controlling an imaging operation of the connected camera 2 in accordance with an internal command supplied from the CPU 110.

The display controller 150 is connected to the display unit 3a of the operation display device 3 and notifies a user of a processing result of the CPU 110 and the like. In other words, the display controller 150 is connected to the display unit 3a and controls display performed in the display unit 3a. The processing result, for example, includes a result of the execution of the setting program.

The input I/F 160 is connected to the touch panel 3b of the operation display device 3 and relays data transmission between the CPU 110 and the touch panel 3b. In other words, the input I/F 160 accepts an operation direction given by a user operating the touch panel 3b. The operation direction, for example, may include an operation direction for setting the compression ratio.

The external memory I/F 170 is connected to the external memory 6 and performs a processing of reading/writing data from/to the external memory 6. The external memory 6 can be attached to or detached from the image processing apparatus 1 and is, typically, a nonvolatile memory device such as a universal serial memory (USB), or a memory card. The image processing apparatus 1 may store information of image data, a measurement result, and the like in the external memory 6. In addition, various programs stored in the hard disk 130 may be stored in the external memory 6 or the server 5. For example, the external memory 6 may be distributed in a state in which various programs executed by the image processing apparatus 1 are stored therein, and the external memory I/F 170 reads various programs from the external memory 6. Alternatively, a program downloaded from the server 5 or the like through the communication I/F 180 may be installed in the image processing apparatus 1.

The communication I/F 180 exchanges various kinds of data between the PLC 4 and the server 5 and the CPU 110. The communication I/F 180 includes hardware corresponding to the NW 1 for exchanging various kinds of data with the PLC 4 and includes hardware corresponding to the NW 2 used for exchanging various kinds of data with the server 5.

In addition, the setting program 131 according to this embodiment may be provided by being embedded in a part of another program. Alternatively, some or all of the functions provided by executing the setting program 131 may be realized using a dedicated hardware circuit.

<D. Function for Supporting Setting of Compression Ratio>

Figure 6:
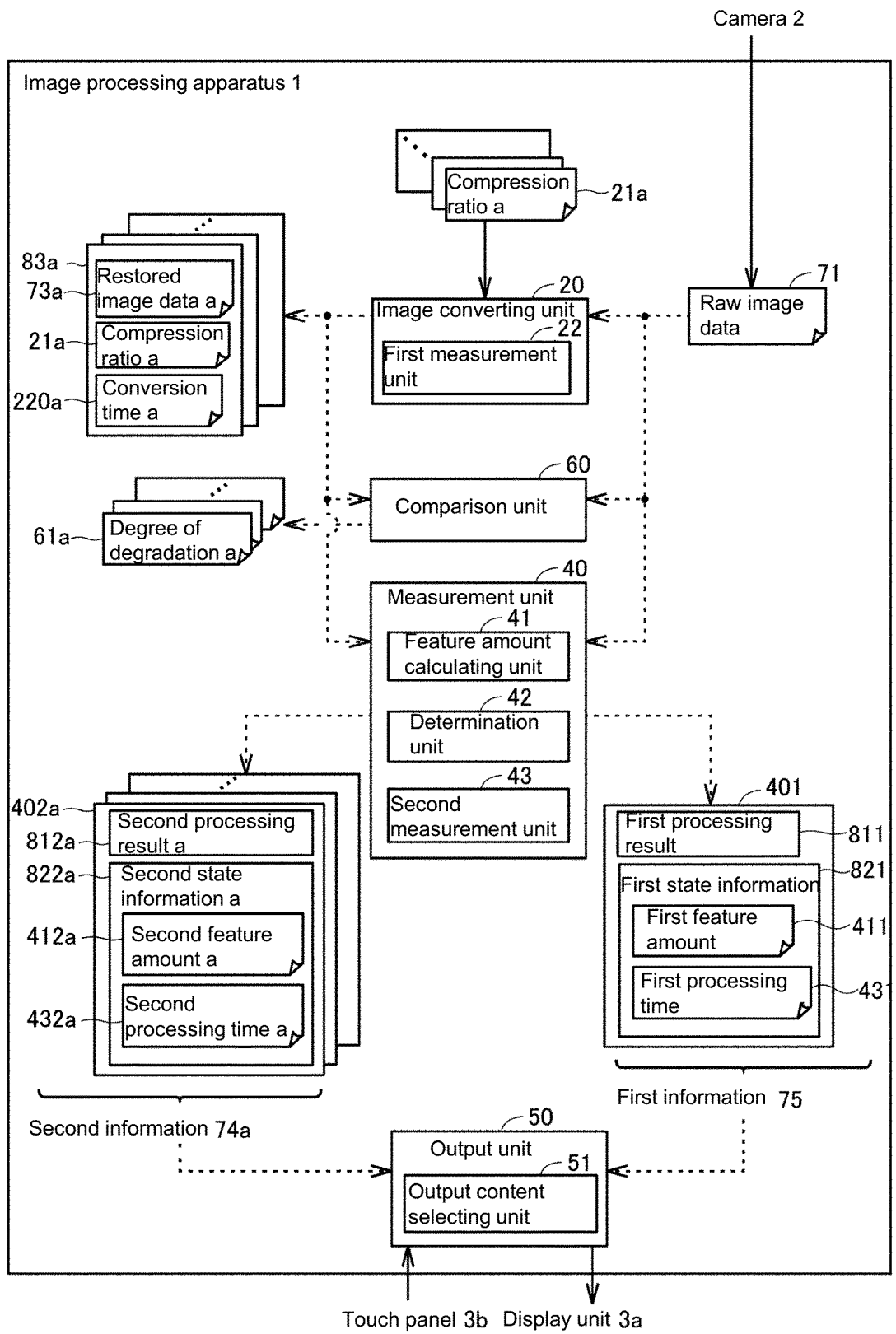
FIG. 6 is a diagram illustrating one example of the functional configuration of an image processing apparatus functioning for realizing a function for supporting the setting of a compression ratio.

FIG. 6 is a diagram illustrating one example of the functional configuration of the image processing apparatus 1 functioning for realizing a function for supporting the setting of a compression ratio.

The image processing apparatus 1 includes an image converting unit 20, a measurement unit 40, and an output unit 50. The image processing apparatus 1 may include a comparison unit 60. The CPU 110 expands the setting program 131 in the main memory 120 and executes the setting program, thereby achieving functions as the image converting unit 20, the measurement unit 40, the output unit 50, and the comparison unit 60.

The image converting unit 20 irreversibly compresses raw image data 71 acquired by imaging an object at a set compression ratio 21 and then restores the compressed image data to image data having the same format as the raw image data 71, thereby generating restored image data 73. The set compression ratio 21 is, for example, a compression ratio 21 that is input by a user operating the touch panel 3b.

The image converting unit 20 may include a first measurement unit 22 that measures a conversion time 220 required for generating the restored image data 73 based on the raw image data 71.

Hereinafter, information acquired by compressing the raw image data 71 will be referred to as conversion information 83. The conversion information 83, for example, includes the restored image data 73, information representing the compression ratio 21, and information representing the conversion time 220. In addition, the conversion information 83 may include the compressed image data 72, information representing the amount of information of the compressed image data 72, and the like.

The comparison unit 60 compares image quality information included in the raw image data 71 with image quality information included in the restored image data 73, thereby calculating the degree of degradation 61 of the restored image data 73 with respect to the raw image data.

The "image quality information" is information representing the image quality of an image and, for example, includes one or a plurality of pieces of pixel information. Each pixel information includes a value representing a color, a value representing luminance, and the like.

The "degree of degradation" is information representing degradation of the image quality and is, for example, information representing a change in the pixel information that is acquired by comparing one or a plurality of pieces of pixel information included in the raw image data 71 with one or a plurality of pieces of pixel information included in the restored image data 73. More specifically, a value acquired by subtracting a value representing a color included in the restored image data 73 from a value representing a color included in the raw image data 71 or the like is included in the degree of degradation.

The measurement unit 40 executes an image measurement processing on image data based on predetermined measurement conditions.

The measurement unit 40 includes a feature amount calculating unit 41 used for executing a process of calculating a feature amount 410 based on image data and a determination unit 42 used for executing a process of calculating a processing result 81 based on the calculated feature amount 410 and a predetermined threshold. The measurement unit 40 may include a second measurement unit 43 that measures a processing time 430 required for the image measurement processing.

The measurement unit 40 executes an image measurement processing on image data, thereby generating state information 82 including the feature amount 410, the processing time 430, and the like and a processing result 81.

For example, the measurement unit 40 executes an image measurement processing on the raw image data 71, thereby generating first state information 821 and a first processing result 811. In addition, the measurement unit 40 executes an image measurement processing on the restored image data 73, thereby generating second state information 822 and a second processing result 812.

Hereinafter, information generated by a processing executed by the measurement unit 40 such as the processing result 81 and the state information 82 will be collectively referred to also as measurement information 400. Among the measurement information 400, information generated based on the raw image data 71 will be referred to as first measurement information 401, and information generated based on the restored image data 73 will be referred to as second measurement information 402.

The output unit 50 outputs first information 75 including the first processing result 811 and at least a part of the first state information 821 and second information 74 including the second processing result 812 and information of the same type as the information included in the first information 75 among the second state information 822 in association with each other.

Here, the first information 75 may include the raw image data 71. In addition, the second information 74 may include the conversion information 83 and information representing the degree of degradation 61.

The output unit 50 may include an output content selecting unit 51. The output content selecting unit 51 selects information to be included in the first information 75 and the second information 74 and selects the first information 75 and the second information 74 to be output. The output content selecting unit 51, for example, selects the first information 75 and the second information 74 to be output based on information input by a user operating the touch panel 3b. The output unit 50, for example, outputs the first information 75 and the second information 74 to the display unit 3a.

In addition, the image converting unit 20 can generate a plurality of pieces of restored image data 73 (73a, 73b, . . . ) based on one piece of raw image data 71 by changing the compression ratio 21 (21a, 21b, . . . ) and can generate conversion information 83 (83a, 83b, . . . ) for each compression ratio 21 (21a, 21b, . . . ). In addition, the comparison unit 60 can generate the degrees of degradation 61 (61a, 61b, . . . ) for the plurality of pieces of restored image data 73 (73a, 73b, . . . ). Similarly, the measurement unit 40 can execute the image measurement processing on the plurality of pieces of restored image data 73 (73a, 73b, . . . ) having different compression ratios and can generate second measurement information 402 (402a, 402b, . . . ) for each compression ratio 21 (21a, 21b, . . . ). In other words, when the image converting unit 20 generates the plurality of pieces of restored image data 73 (73a, 73b, . . . ) based on one piece of raw image data 71 by changing the compression ratio 21 (21a, 21b, . . . ), the second information 74 (74a, 74b, . . . ) is generated for each compression ratio 21 (21a, 21b, . . . ). Hereinafter, when it is unnecessary to distinguish a difference in the compression ratio 21, description will be presented without distinguishing the difference.

<E. Output Form>

A transition to a compression ratio setting screen will be described with reference to FIG. 7. A display form of the display unit 3a when the output unit 50 outputs the first information 75 and the second information 74 in association with each other to the display unit 3a will be described with reference to FIGS. 8 to 15. FIG. 7 is a diagram illustrating one example of a setting screen used for setting saving conditions. FIGS. 8 to 15 are diagrams illustrating examples of the setting screen used for setting an output format.

A saving setting screen 200 illustrated in FIG. 7 includes a target setting area 210 used for setting a saving target and a format setting area 230 used for setting a saving format. By operating a reference button 231 of the format setting area 230, an output format setting screen 300 which is used for selecting an output format while referring to an influence of a change in the image quality (compression ratio) on a measurement result is displayed. In addition, when there is also a case in which a transition from the saving setting screen 200 to the output format setting screen 300 is made, there is also a case in which a transition from a screen (not illustrated in the drawing) used for setting image measurement conditions is made. The case in which a transition from a screen used for setting image measurement conditions is a case in which execution of compression at the first timing (see FIG. 3) is set.

The output format setting screen 300 will be described with reference to FIG. 8. The output format setting screen 300 includes a first area 310, a second area 320, and a third area 330.

The first area 310 includes a tab 311 used for selecting an output format and a tab 312 used for setting a compression ratio. When an OK button 340 is operated after an output format and a compression ratio are input by operating various tabs included in the first area 310, the output format and the compression ratio can be set. The output format, for example, includes a format generated using irreversibly compression and a format generated using lossless compression.

In the second area 320, in accordance with the compression format and the compression ratio selected by a user, an item 321 related to the conversion information 83, an item 322 related to the degree of degradation 61, and an item 323 related to the measurement information 400 acquired by changing the raw image data 71 to the restored image data 73 using the image converting unit 20 are displayed.

In the second area 320, for example, items of information are displayed, and first information 75 ("before conversion" in the drawing) acquired from the raw image data 71 and second information 74 ("after conversion" in the drawing) acquired from the restored image data 73 are displayed for each item.

Figure 8:
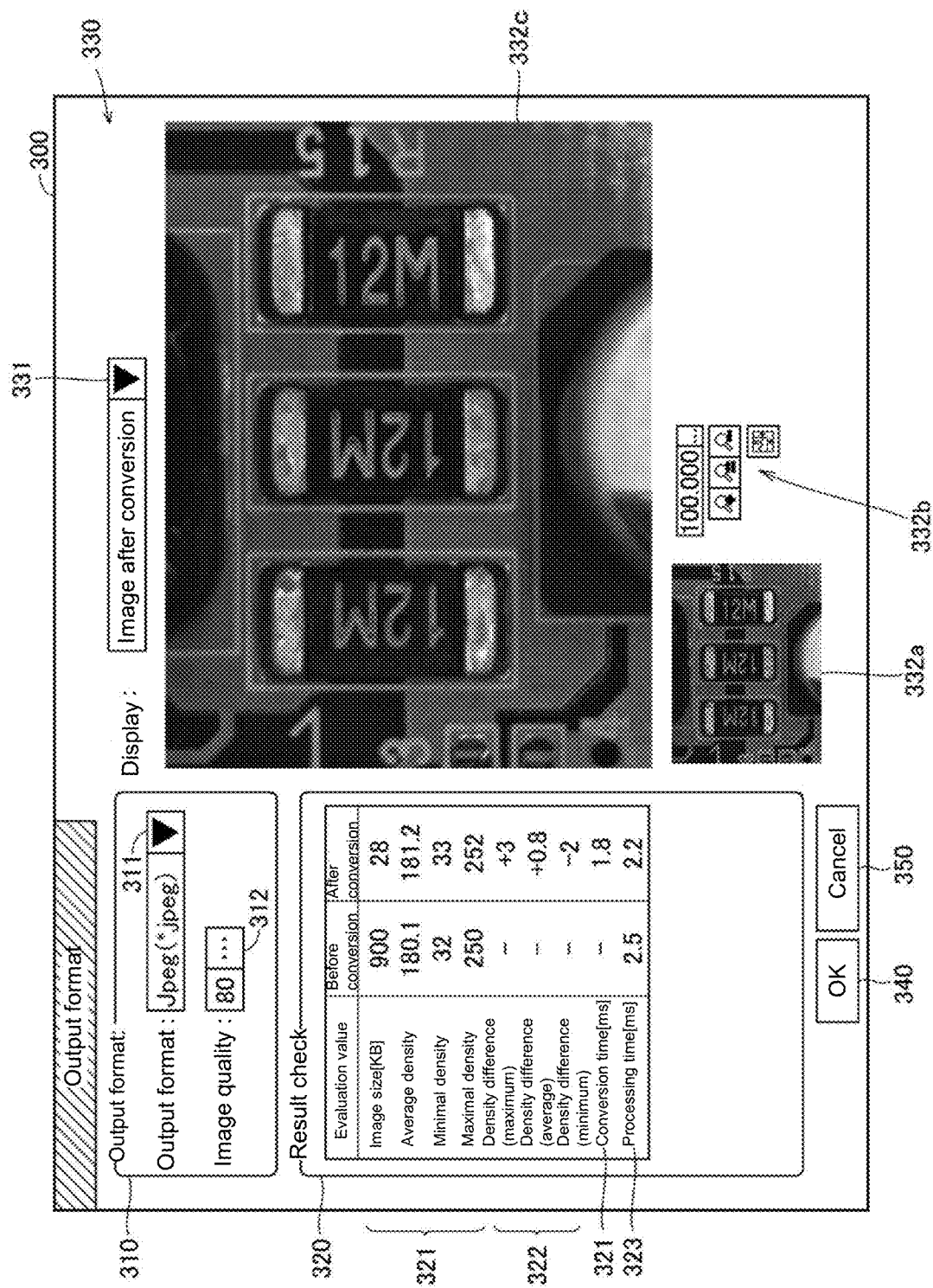
FIG. 8 is a diagram illustrating one example of a setting screen for setting an output format.

For example, in FIG. 8, in the second area 320, "image size," "average density," "minimal density," "maximal density," and "conversion information" are displayed as one example of the conversion information 83. In addition, in the second area 320, "density difference (maximum)," "density difference (average)," and "density difference (minimum)" are displayed as one example of the degree of degradation 61. In the second area 320, "processing time" is displayed as one example of the measurement information 400. Here, the density represents image quality information.

In the third area 330, information corresponding to the content selected by the tab 331 used for selecting the content to be displayed in the third area 330 is displayed. In the example illustrated in FIG. 8, "image after conversion" is selected using the tab 331, and an image corresponding to the restored image data 73 is displayed in the third area 330. In this case, the third area 330 includes a whole display area 332a, a display control icon group 332b, and an image display area 332c.

In the whole display area 332a and the image display area 332c, an image corresponding to the restored image data 73 is displayed. In the whole display area 332a, independently from a display range of the image display area 332c, the whole target image data is displayed. In the whole display area 332a, an image of the display range displayed in the image display area 332c is illustrated. The display range is changed in accordance with a user operation (magnification, reduction, or the like) for the display control icon group 332b, and the display range and the display accuracy of an image displayed in the image display area 332c is changed in accordance with a user operation for the display control icon group 332b.

In this way, by displaying the restored image data 73 compressed at the selected compression ratio on the output format setting screen 300, a user can set the compression ratio (image quality) after checking the degree of degradation of an image. In addition, since the restored image data 73 can be displayed in an enlarged scale, details of an image can be checked.

Figure 9:
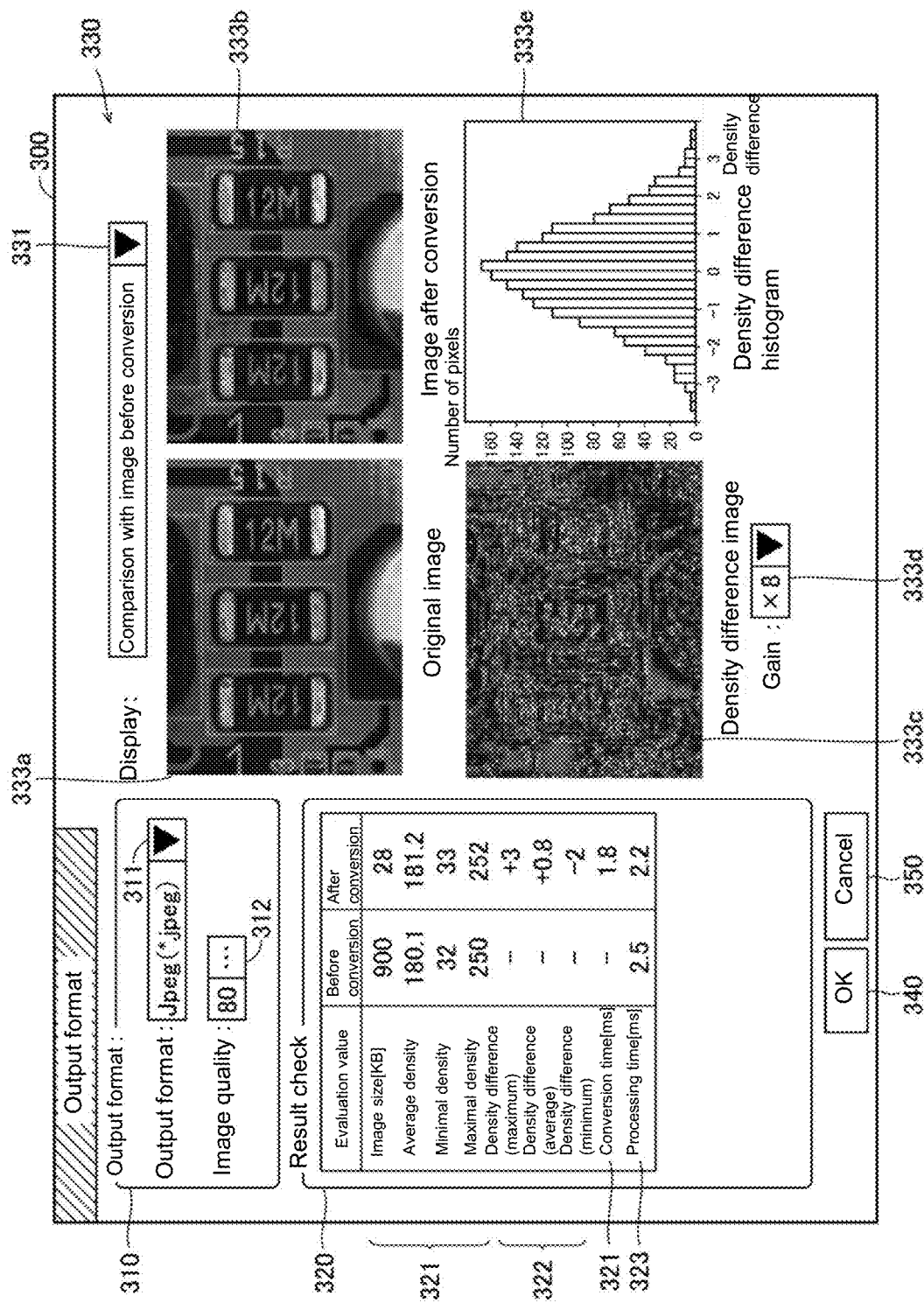
FIG. 9 is a diagram illustrating one example of a setting screen for setting an output format.

In FIG. 9, it is assumed that "comparison with image before conversion" is selected using a tab 331. In FIGS. 9 to 15, the display of the first area 310 and the second area 320 is common to that illustrated in FIG. 8, and thus description thereof will be omitted.

In FIG. 9, in the third area 330, an image 333a corresponding to raw image data 71 and an image 333b corresponding to restored image data 73 are displayed. In addition, a density difference image 333c and a density difference histogram 333e that graphically illustrate the degree of change in a plurality of pieces of pixel information included in the restored image data 73 with respect to a plurality of pieces of pixel information included in the raw image data 71 are displayed. The density difference image 333c and the density difference histogram 333e are also information representing the degree of degradation 61 generated by the comparison unit 60.

In addition, below the density difference image 333c, a tab 333d used for adjusting the contrast of the density difference image 333c is displayed. By operating this tab 333d, a user can adjust the contrast of the density difference image 333c.

In this way, the image 333a corresponding to the raw image data 71 and the image 333b corresponding to the restored image data 73 are adjacently displayed, and accordingly, a user can set the compression ratio (image quality) after comparing the two images with each other. In addition, since the density difference image 333c and the density difference histogram 333e are displayed, more specifically, the degree of change in the image according to the degradation can be visually recognized.

Figure 10:
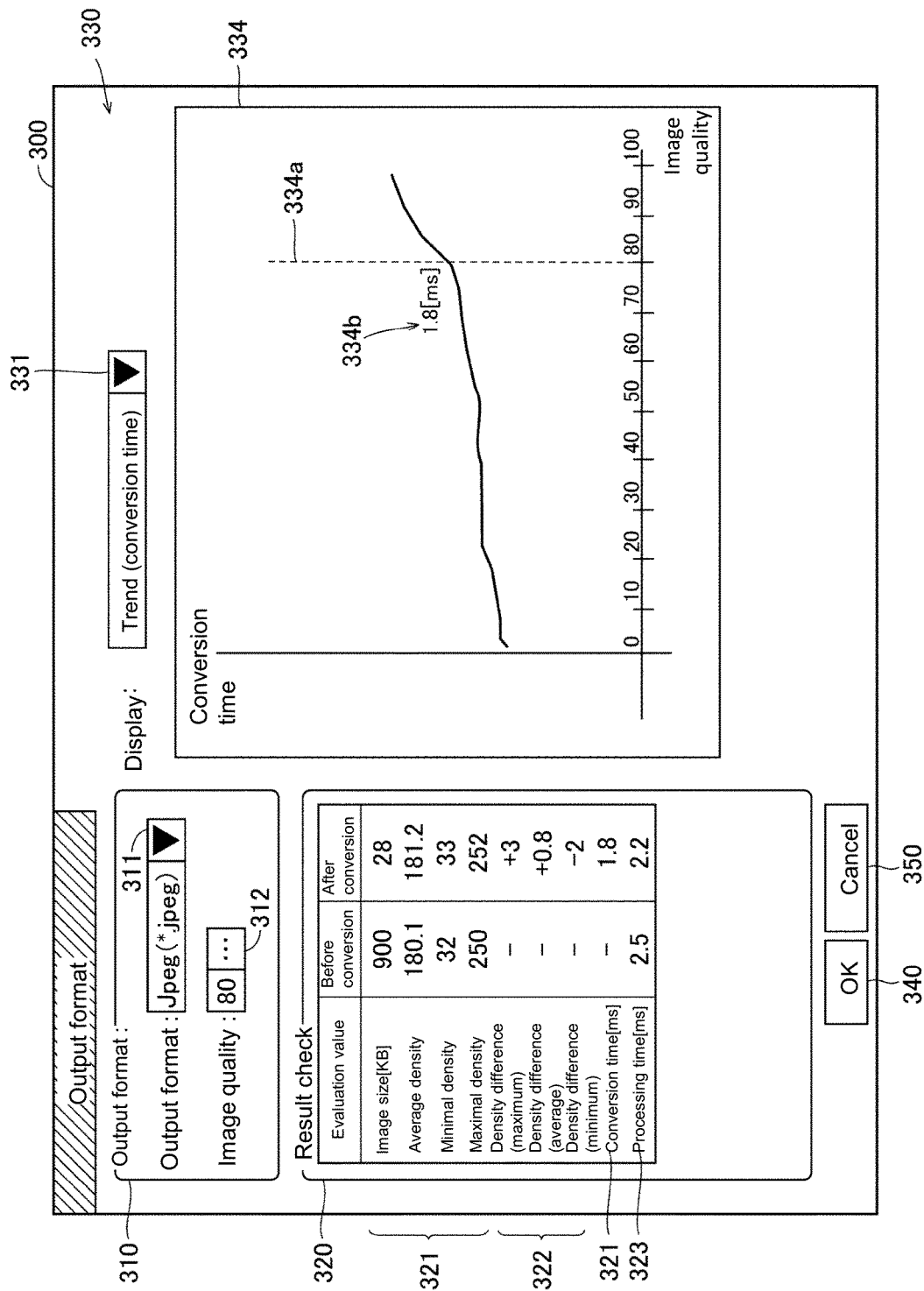
FIG. 10 is a diagram illustrating one example of a setting screen for setting an output format.

In FIG. 10, it is assumed that "trend (conversion time)" is selected using the tab 331. In FIG. 10, in the third area 330, a line graph 334 representing the trend of a change in the conversion time according to a change in the compression ratio is displayed. A line graph 334 is generated based on the conversion time for each compression ratio acquired by generating a plurality of pieces of conversion information with the compression ratio changed using the image converting unit 20. In the line graph 334, an indication line 334a representing image quality (compression ratio) selected in the first area 310 and a conversion time 334b for the image quality (compression ratio) are displayed.

In FIG. 10, although an example in which a graph representing a relation between the conversion time and the compression ratio is displayed is illustrated, a graph representing a relation between the processing time and the compression ratio may be displayed, or two graphs may be displayed in a same graph. In addition, a graph representing a relation between a total time acquired by adding the conversion time and the processing time and the compression ratio may be displayed.

Accordingly, since the relation between the conversion time and the compression ratio can be checked, a user can set an appropriate compression ratio without selecting all the compression ratios one by one. In addition, when a graph representing a relation between the total time acquired by adding the conversion time and the processing time and the compression ratio is displayed, a compression ratio for which the total time required for the image processing is shortest can be selected.

Figure 11:
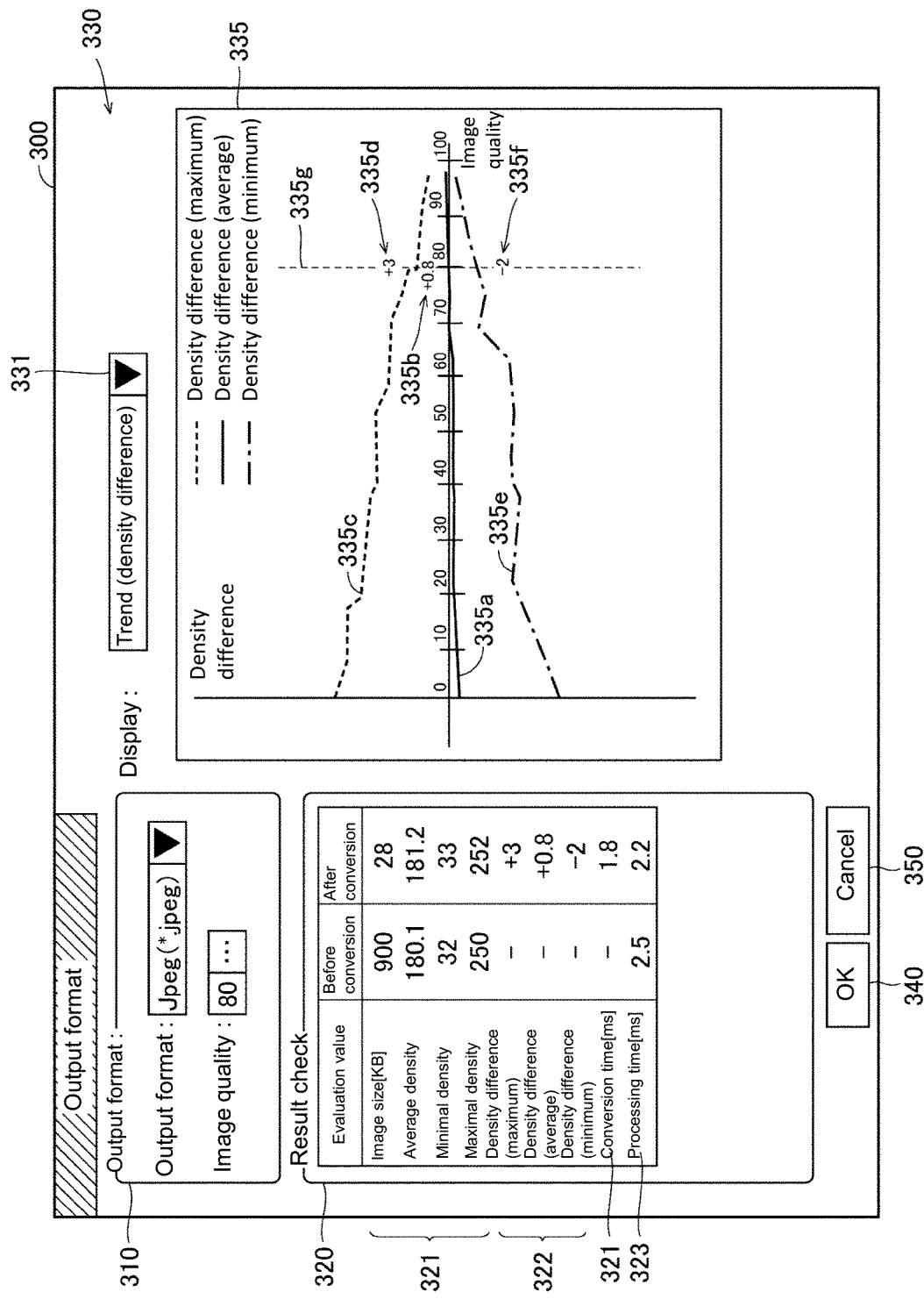
FIG. 11 is a diagram illustrating one example of a setting screen for setting an output format.

In a case illustrated in FIG. 11, it is assumed that "trend (density difference)" is selected using the tab 331. In FIG. 11, a line graph 335 representing a trend of change in the degree of degradation 61 of the restored image data 73 with respect to the raw image data 71 according to a change in the compression ratio is displayed in the third area 330. In FIG. 10, as one example of the degree of degradation 61, an average value 335a, a maximal value 335c, and a minimal value 335e of differences between one or a plurality of pieces of pixel information (density value) included in the raw image data 71 and one or a plurality of pieces of pixel information (density value) included in the restored image data 73 are respectively represented by line graphs in the third area 330. The density value is a value that is calculated by the comparison unit 60, and the line graphs 335 are generated based on the degree of degradation 61 (61a, 61b, . . . ) for each compression ratio 21 (21a, 21b, . . . ) acquired by the image converting unit 20 generating a plurality of pieces of the restored image data 73 by changing the compression ratio and then the comparison unit 60 calculating the degree of degradation 61 for each of the pieces of the restored image data 73. In the line graph 335, an indication line 335g representing image quality (compression ratio) selected in the first area 310 and an average value 335b, a maximal value 335d, and a minimal value 335f of density values for the image quality (compression ratio) are displayed.

In this way, by displaying the trend of change in the degree of degradation 61 according to a change in the compression ratio, a user can set a compression ratio within an allowed range without selecting the compression ratios one by one.

Figure 12:
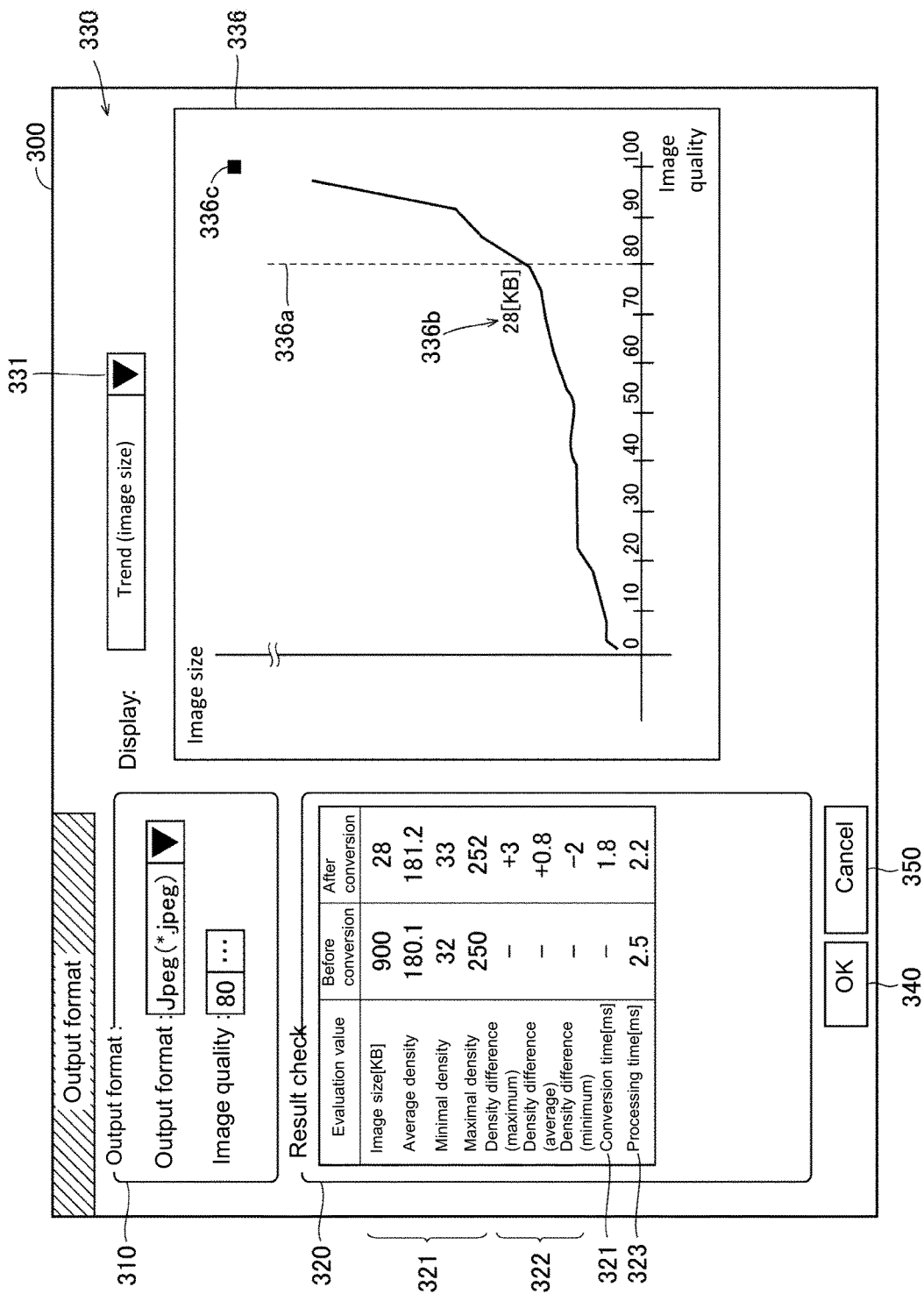
FIG. 12 is a diagram illustrating one example of a setting screen for setting an output format.

In a case illustrated in FIG. 12, it is assumed that "trend (image size)" is selected using the tab 331. In FIG. 12, a line graph 336 representing a trend of change in the image data size before restoration according to a change in the compression ratio is displayed in the third area 330. The line graph 336 is generated based on a plurality of pieces of compressed image data 72 (72a, 72b, . . . ) acquired in the process of the image converting unit 20 generating a plurality of pieces of restored image data 73 (73a, 73b, . . . ) by changing the compression ratio. In the line graph 336, an indication line 336a representing the image quality (compression ratio) selected in the first area 310 and the amount (size) of information 336b of compressed image data before restoration for the image quality (compression ratio) are displayed. In addition, the amount of information 336c of the raw image data 71 is also plotted.

In this way, the user can check the degree of reduction of the amount of information that can be made and the amount of reduction for a selected specific compression ratio.

Figure 13:
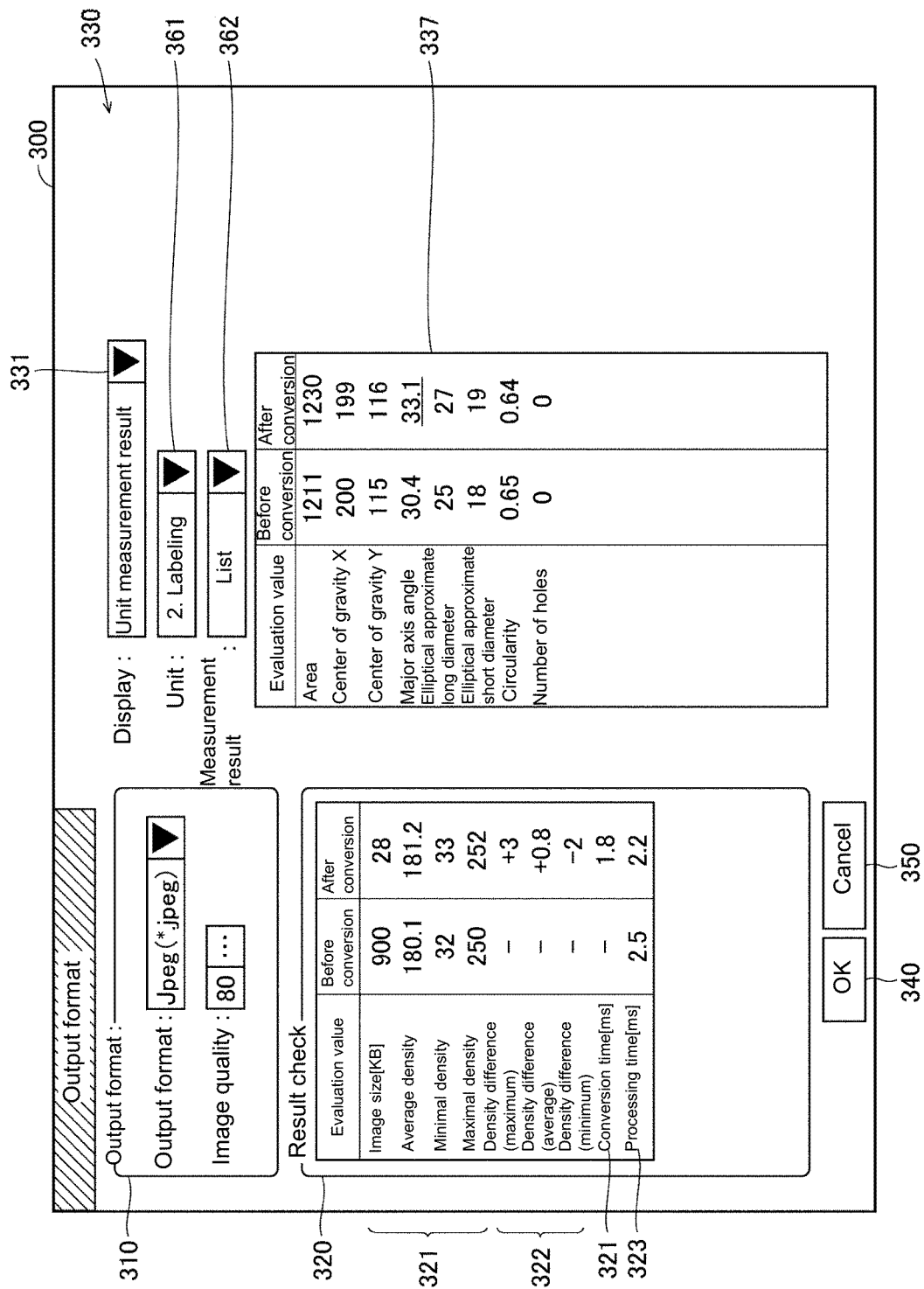
FIG. 13 is a diagram illustrating one example of a setting screen for setting an output format.

In a case illustrated in FIG. 13, it is assumed that "unit measurement result" is selected using the tab 331. When "unit measurement result" is selected, a unit tab 361 used for selecting a type of image measurement and a measurement result tab 362 used for selecting a display form of the measurement result are displayed in the third area 330. In the case illustrated in FIG. 13, "labeling" is selected as a type of image measurement, "list" is selected as a display form of the measurement result, and a table 337 representing results are displayed in the third area 330.

In the table 337, for example, items of physical property values of an object acquired from a labeling result are displayed, and first information 75 ("before conversion" in the drawing) acquired from the raw image data 71 and second information 74 ("after conversion" in the drawing) acquired from the restored image data 73 for each item are displayed.

In addition, a threshold may be set in advance for each physical property value to be measured, and, when a difference between a value after conversion and a value before conversion exceeds the set threshold, the display form of the value after conversion may be configured to be different from that of a case in which the difference does not exceed the threshold. Accordingly, the value after conversion changes more than the value before conversion can be represented for the user. As a result, for example, when the quality of an object is determined based on the physical property, the user can recognize that there is a likeliness of an erroneous determination due to degradation of the image.

In addition, a threshold may be set in advance for each physical property value to be measured, and the display form of the physical property value may be changed using the set threshold as a boundary. Accordingly, the user can easily recognize that, for example, when a determination such as a determination of the quality is performed, different results are acquired for an item of which a value before conversion and a value after conversion have different display forms.

Figure 14:
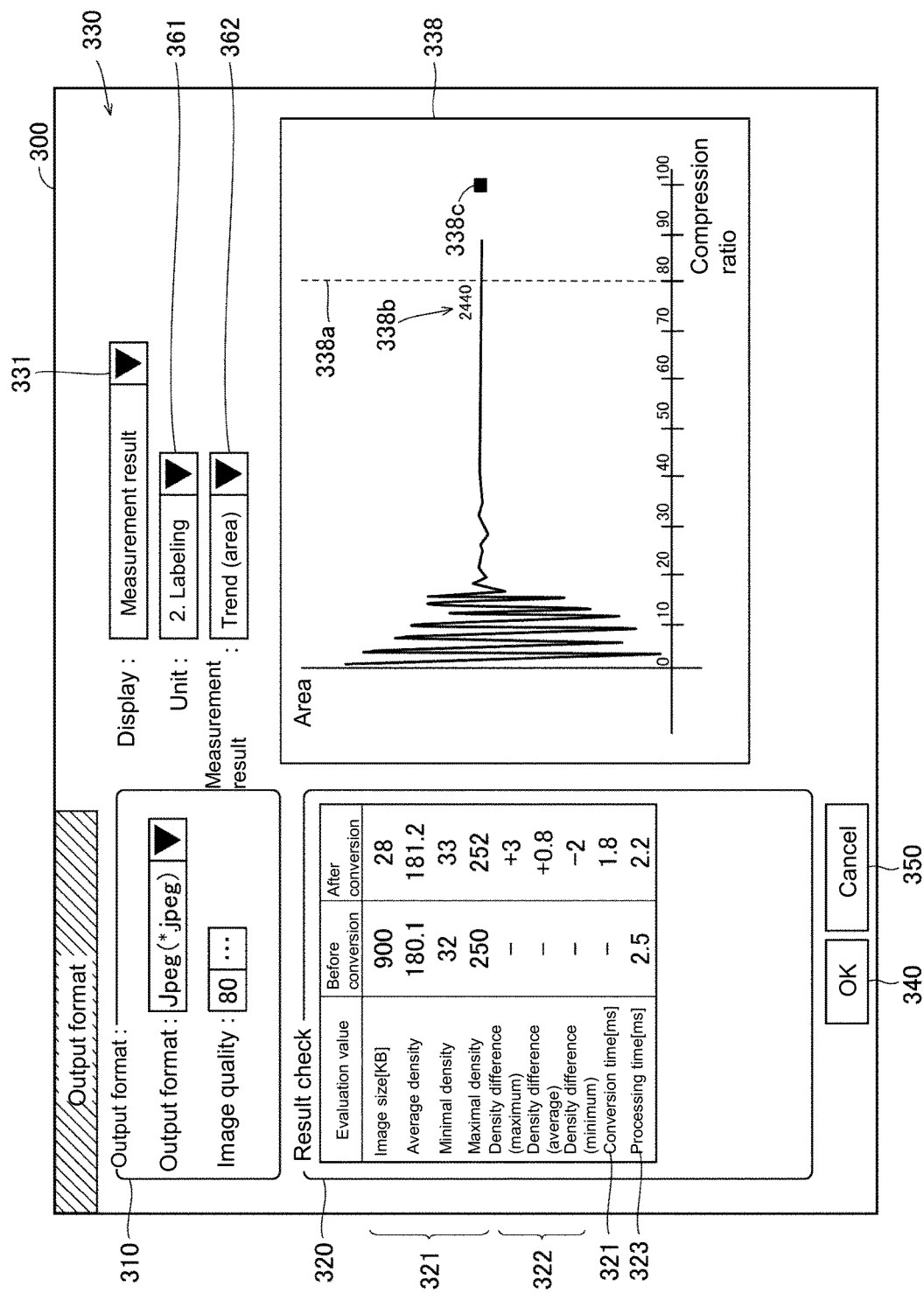
FIG. 14 is a diagram illustrating one example of a setting screen for setting an output format.

In a case illustrated in FIG. 14, it is assumed that "trend (area)" is selected using the measurement result tab 362. Here, the "area" is, for example, an area of a place to which a predetermined label is attached among labeled image data. In FIG. 14, a line graph 338 representing a trend of change in the area value according to a change in the compression ratio is displayed in the third area 330. The line graph 338 is generated based on a second feature amount 412 (412a, 412b, ...) or a second processing result 812 (812a, 812b, ...) acquired by performing the image measurement processing using the measurement unit 40 for a plurality of pieces of restored image data 73 (73a, 73b, ...) generated by the image converting unit 20 changing the compression ratio. In the line graph 338, an indication line 338a representing the image quality (compression ratio) selected in the first area 310 and an area value 338b calculated when the restored image data 73 of the image quality (compression ratio) is labeled are displayed. In addition, an area value 338c calculated when the raw image data 71 is labeled is plotted.

From the line graph 338, a change in the area value according to a decrease in the compression ratio, in other words, information of an influence of degradation of the raw image data 71 on the area value and the degree of the influence occurring in accordance with a degree of degradation can be acquired.

Figure 15:
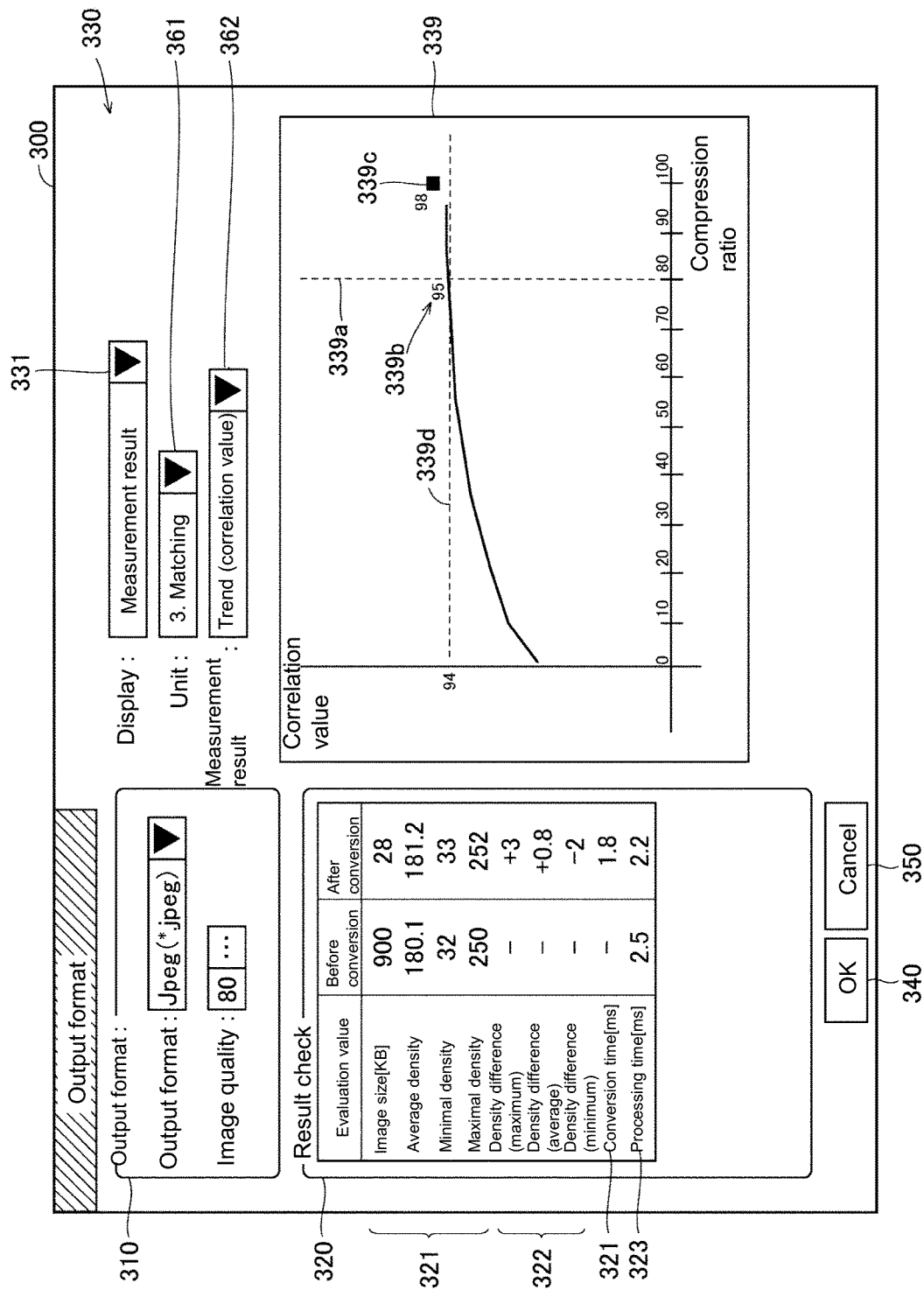
FIG. 15 is a diagram illustrating one example of a setting screen for setting an output format.

In a case illustrated in FIG. 15, it is assumed that "matching" is selected using the unit tab 361. Here, the "matching" represents pattern matching and is a process of calculating a correlation value between model image data registered in advance and image data. For example, the image processing apparatus 1 performs a determination of the quality or the like by comparing the correlation value with a predetermined threshold. In the case illustrated in FIG. 15, it is assumed that "trend (correlation value)" is selected using the measurement result tab 362.

In FIG. 15, a line graph 339 representing a trend of change in the correlation value according to a change in the compression ratio is displayed in the third area 330. The line graph 339 is generated based on the second feature amount 412 (412a, 412b, ...) acquired by the measurement unit 40 performing the image measurement processing on a plurality of pieces of restored image data 73 (73a, 73b, ...) generated by the image converting unit 20 changing the compression ratio. In the line graph 339, an indication line 339a representing image quality (compression ratio) selected in the first area 310, and a correlation value 339b calculated from the restored image data 73 of the image quality (compression ratio) are displayed. In addition, a plot 339c of a correlation value calculated from the raw image data 71 and an indication line 339d representing a threshold are displayed. In this way, by displaying the indication line 339d, a user can visually recognize a degree of compression at which the correlation value divides the threshold.

<F. Others>

The image processing apparatus 1 may include an evaluation unit that evaluates the restored image data 73 after compression using at least one of the conversion information 83 and the measurement information 400. By performing the image conversion, there are advantages of (1) saving the memory when the image is saved and (2) shortening the processing time required for the image processing for a user compared to a case in which the image conversion is not performed. On the other hand, by performing the image conversion, there are disadvantages of (3) lowering the measurement accuracy and (4) requiring a conversion time for converting the image for a user compared to a case in which the image conversion is not performed.

The evaluation unit evaluates the restored image data 73 based on information that becomes an index of (1) to (4). Here, the evaluation unit may evaluate each of a plurality of pieces of restored image data 73 (73a, 73b, ...) of which the compression ratios are different.

In this way, by comprehensively evaluating the advantages and the disadvantages of compression, a user can set an optical compression ratio.

[Supplement]

As described above, this embodiment includes the following disclosure.

(Configuration 1)

An image processing apparatus including: an image converting unit (20) that generates second image data (73) by irreversibly compressing first image data (71) acquired by imaging an object at a predetermined degree of compression and then restoring compressed image data to image data having a same format as the first image data; a measurement unit (40) that executes an image measurement processing on image data based on predetermined measurement conditions; and an output unit (50) that outputs first information (75) including a processing result (811) acquired when the image measurement processing is executed on the first image data and at least a part of information (821) representing a state in an execution process of the image measurement processing and second information (74) including a processing result (812) acquired when the image measurement processing is executed on the second image data and information of a same type as the information (822) included in the first information from the information representing the state in the execution process of the image measurement processing in association with each other.

(Configuration 2)

The image processing apparatus described in Configuration 1, wherein the second information includes information representing an amount of information (336) of the image data (72) before the restoration of the second image data.

(Configuration 3)

The image processing apparatus described in Configuration 1 or 2, wherein the image converting unit further includes a first measurement unit (22) that measures a conversion time (220) required for generating the second image data based on the first image data, and the second information includes information representing the conversion time (334).

(Configuration 4)

The image processing apparatus described in any one of Configurations 1 to 3, wherein the measurement unit further includes a second measurement unit (43) that measures a processing time (430) required for the image measurement processing, and the information (821 and 822) representing the state in the execution process of the image measurement processing includes information representing the processing time (323).

(Configuration 5)

The image processing apparatus described in any one of Configurations 1 to 4, the image measurement processing includes a process (41) of calculating a feature amount (410) from image data, and the information representing the state in the execution process of the image measurement processing includes information representing the feature amount (339).

(Configuration 6)

The image processing apparatus described in any one of Configurations 1 to 5, wherein the output unit further outputs the first image data and the second image data (333a and 333b).

(Configuration 7)

The image processing apparatus described in any one of Configurations 1 to 6, further including a comparison unit (60) that calculates a degree of degradation of the second image data with respect to the first image data by comparing first image quality information included in the first image data with second image quality information included in the second image data, wherein the output unit further outputs the degree of degradation (61) (322, 333c, and 333e).

(Configuration 8)

The image processing apparatus described in any one of Configurations 1 to 7, wherein the image converting unit generates a plurality of pieces of the second image data (73a and 73b) by changing the degree of compression, and the output unit outputs a plurality of pieces of the second information acquired by executing the image measurement processing on the plurality of pieces of the second image data and the degrees of compression in association with each other (334, 335, 336, 338, and 339).

(Configuration 9)

The image processing apparatus described in Configuration 3, wherein the image converting unit generates a plurality of pieces of the second image data (73a and 73b) by changing the degree of compression, and the output unit outputs a relation between the degree of compression and the conversion time (334).

(Configuration 10)

An non-transitory recording medium that records an image processing program (131) for visually measuring an object, the image processing program causing a computer to execute: generating second image data by irreversibly compressing first image data acquired by imaging the object at a predetermined degree of compression and then restoring compressed image data to image data having a same format as the first image data (20); executing an image measurement processing on image data based on predetermined measurement conditions (40); and outputting first information including a processing result acquired when the image measurement processing is executed on the first image data and at least a part of information representing a state in an execution process of the image measurement processing and second information including a processing result acquired when the image measurement processing is executed on the second image data and information of a same type as the information included in the first information from the information representing the state in the execution process of the image measurement processing in association with each other (50).

The embodiments disclosed this time are examples from every aspect and should not be considered as being limited. The scope of the disclosure is represented not in the description presented above but is represented in the claims, and all the changes are intended to be included therein within a meaning and a range that are equivalent to those of the claims. In addition, the disclosure described in the embodiment and each modified example is intended to be performed independently or in combination as is possible.

What is claimed is:

1. An image processing apparatus that visually measures an object, the image processing apparatus comprising:
   an image converting unit that generates second image data by irreversibly compressing first image data acquired by imaging the object at a predetermined degree of compression and then restoring compressed image data to image data having a same format as the first image data;
   a measurement unit that executes an image measurement processing on the first image data and the second image data based on predetermined measurement conditions to generate first information comprising a first processing result of the image measurement processing on the first image data and first state information representing a state of an execution process of the image measurement processing on the first image data and second information comprising a second processing result of the image measurement processing on the second image data and second state information representing a state of an execution process of the image measurement processing on the second image data; and
   an output unit that outputs the first information and the second information in association with each other to determine an influence of degradation of the first image data by the predetermined degree of compression,
   wherein the image measurement processing comprises a process of calculating a feature amount from image data, and the feature amount comprises physical property values of the object, and
   wherein the information representing the state of the execution process of the image measurement processing comprises information representing the feature amount.

2. The image processing apparatus according to claim 1, wherein the second information comprises information representing an amount of information of the image data before the restoration of the second image data.

3. The image processing apparatus according to claim 1, wherein the image converting unit further comprises a first measurement unit that measures a conversion time required for generating the second image data based on the first image data, and
   wherein the second information comprises information representing the conversion time.

4. The image processing apparatus according to claim 1, wherein the measurement unit further comprises a second measurement unit that measures a processing time required for the image measurement processing, and
   wherein the information representing the state of the execution process of the image measurement processing comprises information representing the processing time.

5. The image processing apparatus according to claim 1, wherein the output unit further outputs the first image data and the second image data.

6. The image processing apparatus according to claim 1, further comprising:

a comparison unit that calculates a degree of degradation of the second image data with respect to the first image data by comparing first image quality information comprised in the first image data with second image quality information comprised in the second image data, wherein the output unit further outputs the degree of degradation.

7. The image processing apparatus according to claim 1, wherein the image converting unit generates a plurality of pieces of the second image data by changing the degree of compression, and wherein the output unit outputs a plurality of pieces of the second information acquired by executing the image measurement processing on the plurality of pieces of the second image data and the degrees of compression in association with each other.

8. The image processing apparatus according to claim 2, wherein the image converting unit further comprises a first measurement unit that measures a conversion time required for generating the second image data based on the first image data, and wherein the second information comprises information representing the conversion time.

9. The image processing apparatus according to claim 2, wherein the measurement unit further comprises a second measurement unit that measures a processing time required for the image measurement processing, and wherein the information representing the state of the execution process of the image measurement processing comprises information representing the processing time.

10. The image processing apparatus according to claim 2, wherein the image measurement processing comprises a process of calculating a feature amount from image data, and wherein the information representing the state of the execution process of the image measurement processing comprises information representing the feature amount.

11. The image processing apparatus according to claim 2, further comprising:

a comparison unit that calculates a degree of degradation of the second image data with respect to the first image data by comparing first image quality information comprised in the first image data with second image quality information comprised in the second image data, wherein the output unit further outputs the degree of degradation.

12. The image processing apparatus according to claim 3, wherein the image converting unit generates a plurality of pieces of the second image data by changing the degree of compression, and wherein the output unit outputs a relation between the degree of compression and the conversion time.

13. The image processing apparatus according to claim 3, wherein the measurement unit further comprises a second measurement unit that measures a processing time required for the image measurement processing, and wherein the information representing the state of the execution process of the image measurement processing comprises information representing the processing time.

14. The image processing apparatus according to claim 3, wherein the image measurement processing comprises a process of calculating a feature amount from image data, and wherein the information representing the state of the execution process of the image measurement processing comprises information representing the feature amount.

15. The image processing apparatus according to claim 3, further comprising:

a comparison unit that calculates a degree of degradation of the second image data with respect to the first image data by comparing first image quality information comprised in the first image data with second image quality information comprised in the second image data, wherein the output unit further outputs the degree of degradation.

16. The image processing apparatus according to claim 4, wherein the image measurement processing comprises a process of calculating a feature amount from image data, and wherein the information representing the state of the execution process of the image measurement processing comprises information representing the feature amount.

17. The image processing apparatus according to claim 4, further comprising:

a comparison unit that calculates a degree of degradation of the second image data with respect to the first image data by comparing first image quality information comprised in the first image data with second image quality information comprised in the second image data, wherein the output unit further outputs the degree of degradation.

18. A non-transitory recording medium that records an image processing program for visually measuring an object, the image processing program causing a computer to execute:

generating second image data by irreversibly compressing first image data acquired by imaging the object at a predetermined degree of compression and then restoring compressed image data to image data having a same format as the first image data;

executing an image measurement processing on the first image data and the second image data based on predetermined measurement conditions to generate first information comprising a first processing result of the image measurement processing on the first image data and first state information representing a state of an execution process of the image measurement processing on the first image data and second information comprising a second processing result of the image measurement processing on the second image data and second state information representing a state of an execution process of the image measurement processing on the second image data; and outputting the first information and the second information in association with each other to determine an influence of degradation of the first image data by the predetermined degree of compression, wherein the image measurement processing comprises a process of calculating a feature amount from image data, and the feature amount comprises physical property values of the object, and wherein the information representing the state of the execution process of the image measurement processing comprises information representing the feature amount.

* * * * *